US006466514B1

(12) United States Patent
Kabel

(10) Patent No.: US 6,466,514 B1
(45) Date of Patent: Oct. 15, 2002

(54) METHOD FOR ELIMINATION OF PASSIVE NOISE INTERFERENCE IN SONAR

(75) Inventor: Darrin W. Kabel, Overland Park, KS (US)

(73) Assignee: Garmin Corporation (TW)

( * ) Notice: Subject to any disclaimer, the term of this patent is extended or adjusted under 35 U.S.C. 154(b) by 0 days.

(21) Appl. No.: 09/591,812

(22) Filed: Jun. 12, 2000

Related U.S. Application Data

(62) Division of application No. 09/164,816, filed on Oct. 1, 1998, now Pat. No. 6,108,269.

(51) Int. Cl.[7] .............................................. G01S 15/88
(52) U.S. Cl. .............................. 367/98; 367/87; 367/99
(58) Field of Search .............................. 367/87, 98, 99, 367/134, 910

(56) References Cited

U.S. PATENT DOCUMENTS

| | | | |
|---|---|---|---|
| 3,893,061 A | 7/1975 | Slawsky et al. ............. | 367/134 |
| 4,700,332 A | 10/1987 | Hwang ......................... | 367/98 |
| 4,777,630 A | 10/1988 | Burns .......................... | 367/87 |
| 5,235,315 A | * 8/1993 | Cherry et al. ............... | 340/435 |
| 5,260,912 A | 11/1993 | Latham ........................ | 367/98 |
| 5,459,479 A | 10/1995 | Cummings .................. | 367/108 |
| 6,108,269 A | * 8/2000 | Kabel .......................... | 367/98 |

* cited by examiner

Primary Examiner—Ian J. Lobo
(74) Attorney, Agent, or Firm—Devon A. Rolf

(57) ABSTRACT

A sonar depth sounder device and method for processing echo signals, reflected from objects within a body of water, utilizes a processor, a memory, a display, and a keypad connected to the processor. The receiver receives sonar signals indicative of ambient noise in an underwater environment. The processor receives an electrical signal representative of the ambient noise, and calculates a detection threshold. The detection threshold is calculated by multiplying a scaling factor times the variance of the signal indicative of the ambient noise, and adding that product to the mean of the signal indicative of the ambient noise in the underwater environment. A transmitter then excites a transducer which emits sonar pulses into a body of water, and a receiver receives reflected sonar echo signals. When the intensity of the reflected sonar echo signals is less than the detection threshold, the reflected echo signals are eliminated from processing. When, however, the amplitude of a reflected sonar signal is greater than the detection threshold, the processor causes data indicative of the reflected sonar signal to be displayed on the display. Further, the detection threshold is increased from its starting point over time to compensate for increasing a gain in the receiver of the sonar depth sounder device. Additionally, the detection threshold is periodically updated to compensate for changes in ambient noise in the underwater environment.

6 Claims, 2 Drawing Sheets

METHOD FOR ELIMINATION OF PASSIVE NOISE INTERFERENCE IN SONAR

CROSS REFERENCE TO RELATED APPLICATIONS

This application is a divsional of Ser. No. 09/164,816, filed Oct. 1, 1998, now U.S. Pat. No. 6,108,269.

BACKGROUND OF THE INVENTION

1. Field of the Invention

The present invention is generally directed to a depth sounder, such as employed in fish finding apparatus. More particularly, the present invention is directed to a depth sounder and method for eliminating noise.

2. Description of the Related Art

The use of sonar echo sounding for recreational and commercial fish finding purposes, and for other underwater object identification, is widespread. These devices utilize sonar signals to develop a view of underwater environment.

One major problem faced by manufacturers of depth sounders is that, underwater environments are often noisy and the noise levels can, and do, vary widely. This noise interferes with accurate underwater detection and makes it difficult, both for the device and the user, to interpret an underwater environment.

In order to alleviate the problem of noise, many prior depth sounder products utilize what is commonly known as a detection threshold, of a selected amplitude, such that sonar echo signals, which correspond to sonar pulses transmitted from the sounder device and which have reflected off of the bottom of a body of water or off of any object in the water, that are louder than the detection threshold are accepted, while sonar echo signals that are quieter than the detection threshold are rejected. More particularly, such products typically display, on a display screen, data corresponding to sonar echo signals which are louder than the detection threshold, but do not display data corresponding to sonar echo signals which are quieter than the detection threshold.

As will be appreciated, the placement of the detection threshold is a critical step in the manufacture of such depth sounders. In this regard, the higher the detection threshold value, the more noise that will be rejected and the more likely echo signals received by the depth sounder will be accurately interpreted as underwater environment. However, a high detection threshold has the drawback of potentially rejecting weak signals that, when compared with a lower detection threshold, would have been received and interpreted. Conversely, a low detection threshold allows weaker (and thus a potentially greater number of sonar echos) to be received and interpreted, but increases the likelihood that noise will be incorrectly interpreted as underwater environment.

While there are many theories and practices relating to the proper placement of the detection threshold, the need remains for a sonar depth sounder which efficiently adjusts the detection threshold based upon a change in noise levels. The present invention fills this need and other needs, in a unique manner.

SUMMARY OF THE INVENTION

A sonar depth sounder of the present invention has a processor. An input, a display, and a memory, are connected to the processor. The processor is connected to a transmitter/receiver, which is in turn connected to a transducer. In use, the transmitter transmits a plurality of signals, which are emitted from the transducer as sonar signals towards the bottom surface of a body of water. The receiver receives sonar signals reflected back from the bottom surface of the body of water, and reflected from any objects resting on the bottom surface of the body of water or suspended between the top surface of the body of water and the bottom surface of the body of water.

In accordance with an aspect of the present invention, the processor first takes a passive noise interrogation such that the receiver receives sonar signals that are not echo signals received in response to a corresponding transmission from the transmitter. Rather, the processor receives, from the receiver, a signal representative of the ambient noise in the underwater environment. The processor processes that signal to calculate a detection threshold value, and stores the detection threshold value in the memory of the sounder device.

More particularly, the processor calculates a mean of the sonar signal representative of the environmental noise in the underwater environment, and also calculates a variance of the signal. Specifically, the processor determines the detection threshold (DT) value according to the following equation:

$$DT = \text{mean} + \alpha \text{ variance}$$

where mean is the mean of the signal indicative of the ambient noise in the underwater environment, variance is the variance of the signal indicative of the ambient noise in the underwater environment, and $\alpha$ is a scaling factor. The scaling factor $\alpha$ is determined through testing, and is preferably approximately 7. Other scaling factors, however, could be utilized.

Once the detection threshold value is stored in memory, the processor causes the transmitter to transmit a plurality of signals, which are emitted from the transducer as sonar signals, towards the bottom surface of the body of water. As stated, the receiver receives reflected echo sonar signals back from the bottom surface of the body of water, and reflected from any objects on the bottom surface or suspended between the top and bottom surface of the body of water. The processor receives electrical signals indicative of the reflected sonar signals, and determines whether these signals are of an amplitude greater than the detection threshold. When the signals are greater in amplitude than the detection threshold value, the processor displays data, on the display, indicative of the underwater environment. For example, in accordance with known techniques, in the event a reflected echo signal is believed to indicate that a fish is located within the body of water, an icon indicative of a fish is displayed on the display.

In accordance with an additional aspect of the invention, from a point in time at which the transmitter transmits a sonar signal into the body of water, the detection threshold value is increased over time to compensate for increased gain associated with the receiver. In this regard, it will be understood that for sonar depth sounders which an increase of gain over time, the detection threshold value ramps upwardly linearly over time at a slope that is determined through testing. It will be understood, however, that increasing the detection threshold value over time could be accomplished in other manners.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
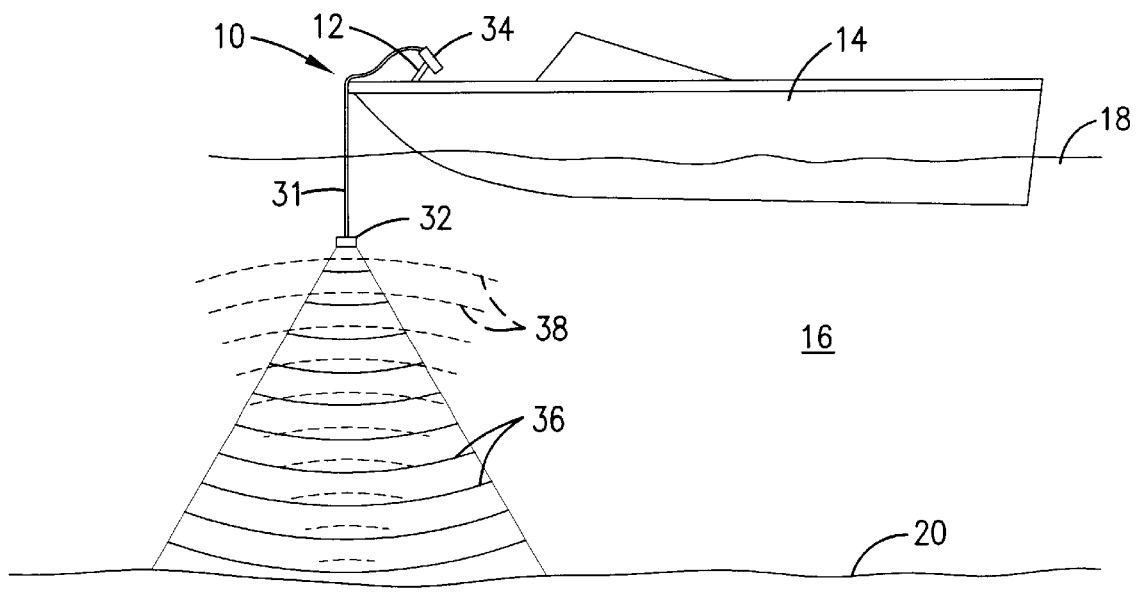
FIG. 1 is a side elevational view of a boat having a depth sounder of the present invention installed thereon.

With reference to the figures, and particularly FIG. 1, a sonar depth sounder of the present invention is designated generally by reference numeral 10. As illustrated, sonar depth sounder 10 is positioned by a mount 12 on the deck of a boat 14, which is floating in a body of water 16. The body of water 16 has a top surface 18, and a bottom surface 20.

Figure 2:
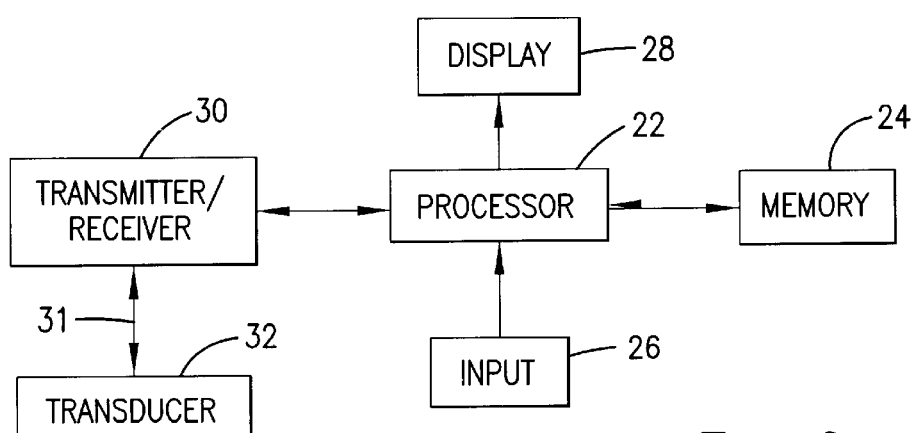
FIG. 2 is a block diagram of the components of the depth sounder of the present invention.

With additional reference to FIG. 2, sonar depth sounder 10 has a processor 22 and a memory 24, connected as shown. An input 26, such as a keypad, is connected to processor 22. Additionally, a display 28, for displaying a visual representation of bottom surface 20 of the body of water, and objects floating in the body of water, is also connected to processor 22. A transmitter/receiver combination, designated by reference numeral 30, is also connected to processor 22. A transducer 32 is connected to transmitter/receiver combination 30, as illustrated.

As illustrated in FIG. 1, the sonar depth sounder 10 of the present invention has a housing 34, connected to the mount 12. As will be understood, processor 22, memory 24, input 26, display 28, and transmitter/receiver 30 are housed within housing 34. Particularly, input 26, and display 28 are accessible at a face of housing 34 in a conventional fashion. Transducer 32 is suspended, from line 31, into the body of water 16.

Figure 3:
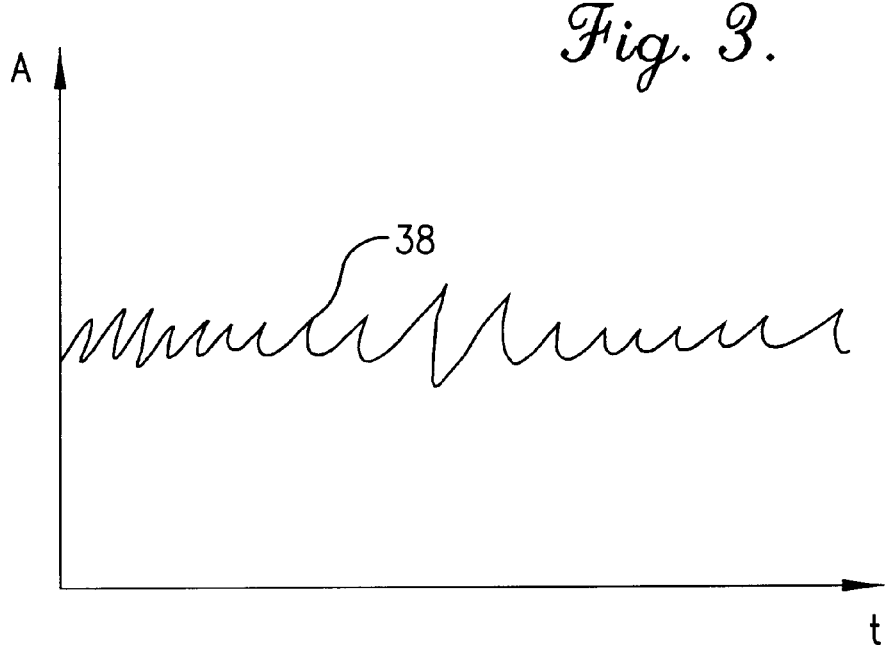
FIG. 3 is a graphical representation of a sonar signal representative of ambient noise.

During operation of sonar depth sounder 10, processor 22 first controls the receiver portion of transmitter/receiver combination 30 to receive sonar signals indicative of ambient noise in the underwater environment. Particularly, processor 22 receives an electrical signal indicative of the ambient, environmental noise in the underwater environment. With reference to FIG. 3, a sonar signal 38 indicative of the ambient noise in the underwater environment is illustrated. Processor 22 receives sonar signal 38, and processes the signal 38 to calculate a detection threshold value. Particularly, the processor calculates the detection threshold value (DT) according to the following equation:

$$DT = \text{mean}_{ambient} + \alpha \text{ variance}_{ambient}.$$

Where $\text{mean}_{ambient}$ is the mean of the signal 38 indicative of the ambient noise in the underwater environment, $\text{variance}_{ambient}$ is the variance of the signal 38 indicative of the ambient noise in the underwater environment, and $\alpha$ is a scaling factor. The scaling factor a has been determined by testing, and is preferably between 2 and 15, and more particularly, is preferably about 7. It will be understood and appreciated that other scaling factors could be used.

The detection threshold (DT) value calculated by processor 22 is stored in memory 24 of depth sounder device 10.

During additional operation of sonar depth sounder 10, processor 22 controls the transmitter portion of transmitter/receiver combination 30 to emit a plurality of output pulses. Those pulses cause transducer 32 to emit a series of sonar signals into the body of water 16. Particularly, transducer 32, when activated by the transmitter, sends out an ultrasonic pressure wave in an expanding pattern into the body of water 16. As will be readily appreciated by those skilled in the art, that expanding pattern defines what is often referred to, in simplified terms, as a cone of detection. FIG. 1 illustrates the expanding ultrasonic waves emitted from transducer 32 by reference numeral 36. The ultrasonic waves 36 bounce, or echo, off of the bottom surface 20, sending back expansion echo waves, designated generally by reference numeral 38. As will be readily understood, echos also reflect off of objects suspended within the body of water 16, including particularly fish. The receiver portion of transmitter/receiver combination 30 receives the echo waves and sends the signals (e.g., data) representative of the received echo waves to processor 22 for processing.

Figure 4:
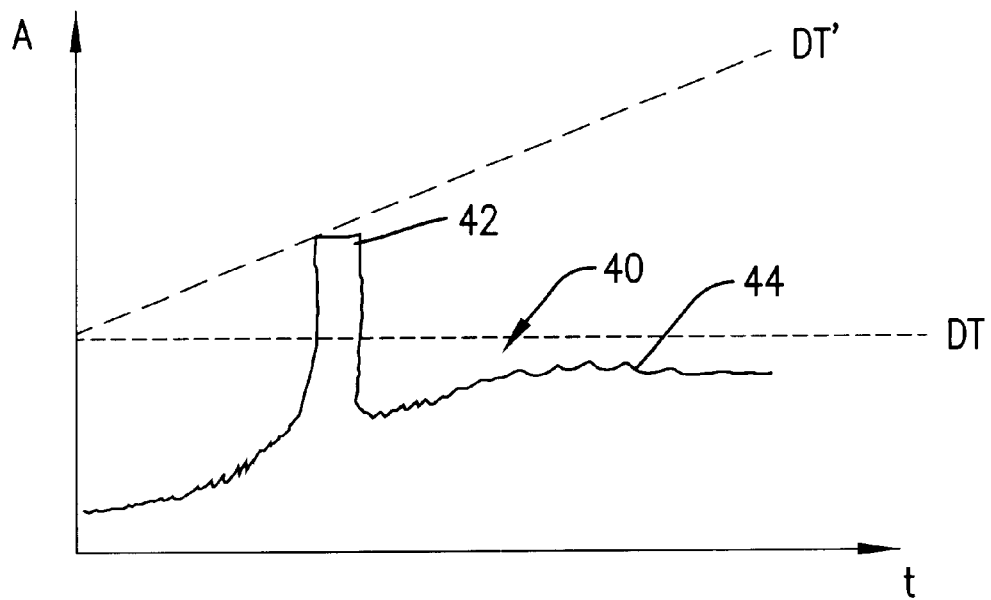
FIG. 4 is a graphical representation of a signal indicative of a sonar echo signal received by the receiver of the sonar device.

With additional reference to FIG. 4, a graphical representation in the form of a timing diagram is presented which illustrates, in signal form, a received echo signal, as designated by reference numeral 40. As illustrated, echo signal 40 includes echo portion 42 and additive noise, as indicated by reference numeral 44.

In accordance with an important aspect of the invention, processor 22 processes the received echo signal and eliminates any portion of the signal having an amplitude lower than the detection threshold value. In accordance with known display control techniques, processor 22 then causes display 28 to display a visual representation of that data in echo signal 40 which is greater in amplitude than the detection threshold value. Particularly, that data which is greater in amplitude than the selected detection threshold value is processed according to an object identification algorithm, as illustrated and described in U.S. patent application Ser. No. 09/075,416 entitled "Depth Sounder With Object Identification Feature", incorporated herein by reference in its entirety.

In accordance with an additional important aspect of the present invention, the detection threshold value is periodically updated. In this regard, at a selected interval, processor 22 causes the receiver of transmitter/receiver combination 30 to receive sonar signals generated from ambient noise conditions in the underwater environment. Those sonar signals are utilized by processor 22 to calculate an updated detection threshold value, which is stored in memory. Preferably, the detection threshold value is updated approximately every second. Thus, as the ambient noise levels in an underwater environment change, the detection threshold value is changed to permit the processor 22 to process active data received in response to a noise interrogation from the transmitter, and then display only data indicative of underwater objects or features which are represented by sonar signals having an amplitude greater than the updated detection threshold value. Stated differently, an increase in ambient noise in the underwater environment causes the processor to eliminate additional data, so as to prevent the display 26 from being cluttered with visual representations of noise. Alternatively, when the ambient noise levels in the underwater environment decrease, the detection threshold value is lowered, thereby permitting weaker, and potentially a greater number of signals, to be received and processed by the processor 22, thus permitting additional object identification data to be displayed on display 26.

In accordance with yet an additional aspect of the invention, the detection threshold value is preferably increased over time from its starting point, as illustrated graphically, by reference DT' in FIG. 4. This increase in the detection threshold value compensates for the increase in gain which is occurring over time in conventional fashion in depth sounder device 10. Preferably, the detection threshold value increases linearly over time at a slope determined through testing.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A sonar depth sounder device comprising:
   a display;
   a transmitter for generating a plurality of sonar signals toward the bottom surface of body of water wherein said transmitter transmits at least one sonar signal towards a bottom, surface of said body of water;
   a receiver, wherein said receiver receives a reflected sonar signal corresponding to said transmitted signal; and
   a processor connected to said transmitter and said receiver, wherein said processor receives sonar signals indicative of ambient noise in said body of water;
   wherein said processor determines a detection threshold value based upon said signals representative of said ambient noise;
   wherein said processor causes said display to display data corresponding to said, reflected sonar signal when said reflected sonar signal has an amplitude greater than said detection threshold; and
   wherein said detection told threshold varies linearly over time according to a predetermined slope.

2. The sonar depth sounder device as set forth in claim 1, wherein said slop is sufficient to allow said detection threshold to compensate for a gain in said receiver.

3. A method for eliminating ambient noise received by a sonar depth sounder having a display, said method comprising:
   detecting ambient noise in an underwater environment;
   generating an electrical signal indicative of said ambient noise;
   calculating a detection threshold value based on said electrical signal;
   transmitting at least one sonar signal into said underwater environment;
   receiving with a receiver an echo sonar signal corresponding to said transmitted signal;
   determining whether said echo sonar signal has an amplitude that is greater than said detection threshold value;
   when said amplitude of said echo sonar signal is greater than said detection threshold value, displaying data indicative of said echo sonar signal on said display; and
   varying said detection threshold linearly according to a predetermined slope.

4. The method for eliminating ambient noise as set forth in claim 3, wherein said slope is sufficient to allow said detection threshold to compensate for a gain in said receiver.

5. A method for eliminating ambient noise received by a sonar depth sounder having a display, said method comprising:
   detecting ambient noise in an underwater environment with a receiver;
   generating an electrical signal indicative of said ambient noise;
   calculating a detection threshold value based on said electrical signal;
   transmitting at least one sonar signal into said underwater environment;
   receiving at the receiver an echo sonar signal corresponding to said transmitted signal;
   determining whether said echo sonar signal has amplitude that is greater than said detection threshold value;
   when said amplitude of said echo sonar signal is greater than said detection threshold value, displaying data indicative of said echo sonar signal on said display; and
   periodically updating said detection threshold value to compensate for a gain of said receiver.

6. A sonar depth sounder device comprising:
   a display;
   a transmitter for generating a plurality of sonar signals toward the bottom surface of a body of water;
   a receiver for receiving sonar signals indicate of ambient noise in said body of water, said receiver having a gain which increases over time; and
   processor coupled with said transmitter and said receiver for receiving from the receiver a signal representative of said ambient noise and for determining a detection threshold value based upon said signal representative of said ambient noise said processor being further operable for increasing said detection threshold over time to compensate for the increasing gain of said receiver.

* * * * *